No. 876,604. PATENTED JAN. 14, 1908.
R. L. STEVENS.
COMBINATION OF MEANS FOR SURVEYING AND NAVIGATION.
APPLICATION FILED FEB. 18, 1907.
2 SHEETS—SHEET 1.
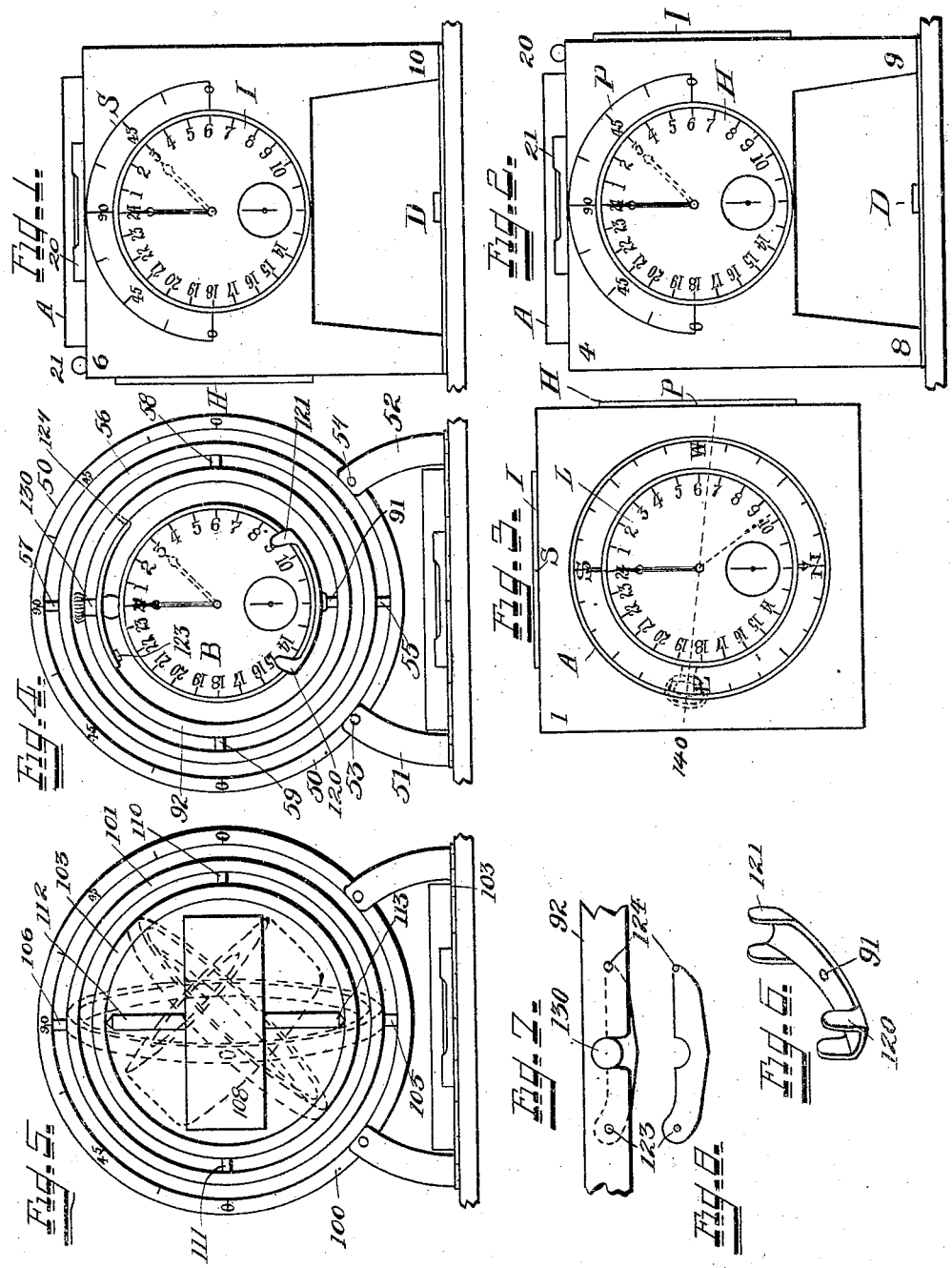
WITNESSES:
George S. Baily
Thos Maloney
INVENTOR.
Robert Livingston Stevens
BY
ATTORNEY.

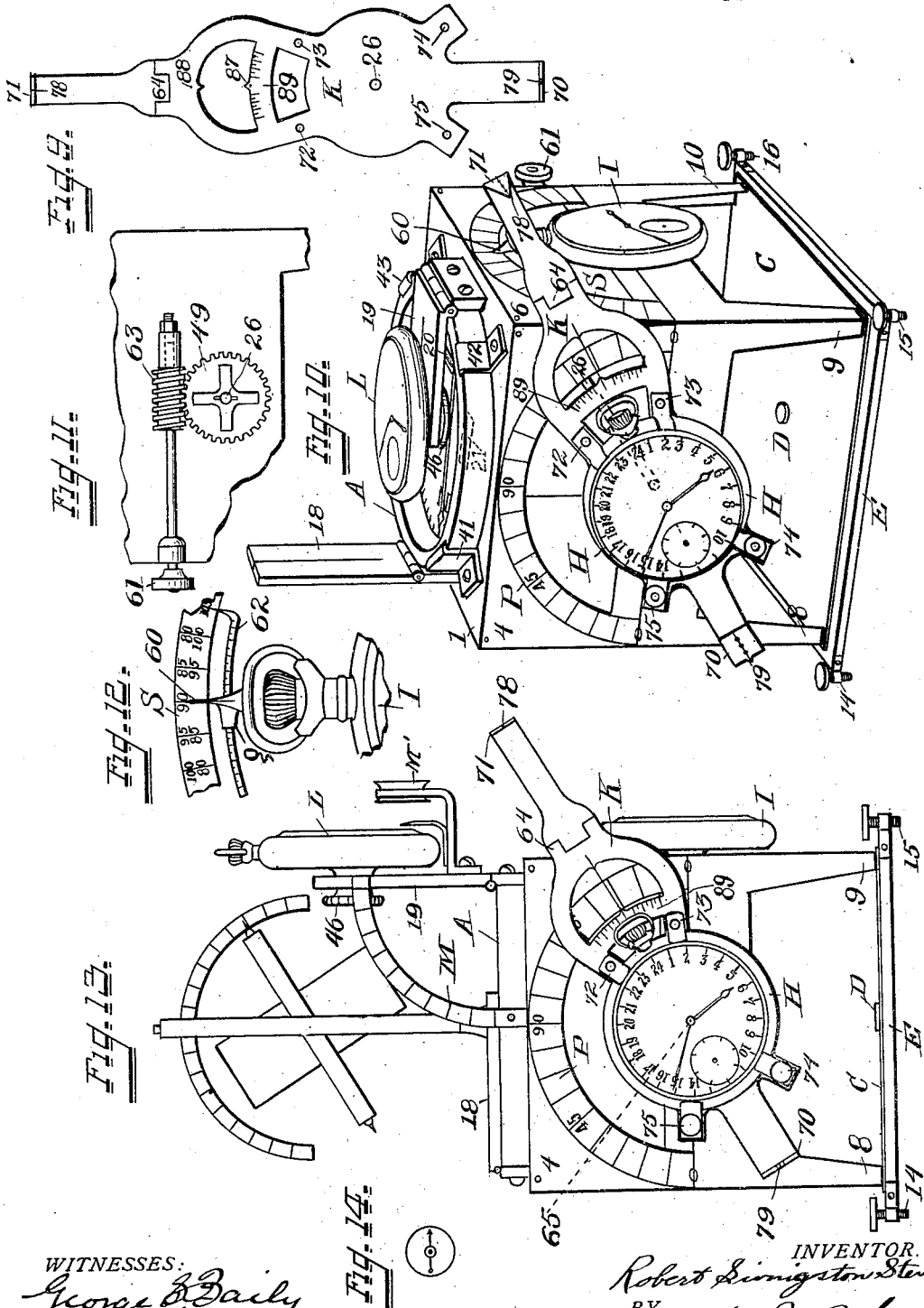

UNITED STATES PATENT OFFICE.

ROBERT LIVINGSTON STEVENS, OF HARTWELL, OHIO.

COMBINATION OF MEANS FOR SURVEYING AND NAVIGATION.

No. 876,604.

Specification of Letters Patent.

Patented Jan. 14, 1908.

Application filed February 18, 1907. Serial No. 358,105.

*To all whom it may concern:*

Be it known that I, ROBERT LIVINGSTON STEVENS, a citizen of the United States, residing at Hartwell, in the county of Hamilton, of the State of Ohio, have invented a certain new and useful Combination of Means for Surveying and Navigation, of which the following is a full, clear, and exact description, reference being had to the accompanying drawings, forming part of this specification.

My invention relates to very simple and efficient means for carrying out my improved art of surveying and navigation, which means can be contained in very small space, are comparatively inexpensive considering the objects they attain, and which consist essentially of one or more accurate chronometers or watches, (preferably of the twenty-four hour dial type), with levels, standards, and a magnetic compass, as in the common vernier compass, with scales adjacent to the same, combined with a gyroscope. The driving power of the mechanism of the watch, or the electric or magnetic driving power of the gyroscope are not shown. By these combinations disposed as hereinafter described with relation to each other, I am enabled to obtain the latitude of, or longitude of any place on the surface of the earth, wherever the observer may happen to be with one of these instruments in his possession by day or night or in a closed room.

The novelty of my invention depends on so disposing the watch that it can show simultaneously latitude and longitude, that while so doing it can be placed to act as a perfect compass; moreover when sun, star, or gyroscope culminates, it gives the true latitude and longitude at the same instant, and also by marking the irregular movement (apparent) of the sun, or star under atmospheric conditions, it points out errors of refraction, and when used with a gyroscope, the movement of a star can be followed while in a closed room and the latitude and longitude taken; all of which will be more specifically set forth in the description and claims.

In the accompanying drawings, Figure 1, is a vertical side of an apparatus for carrying out my invention; Fig. 2, a vertical side at right angles to Fig. 1; Fig. 3, is a top view of the apparatus; Fig. 4, is a modification showing the principle of the invention in another form; Fig. 5, is a gyroscope to be used in connection with the watch; Fig. 6, shows the lower watch-holding mechanism of Fig. 4; Fig. 7, shows locking mechanism of Fig. 4; Fig. 8, a plan view of part of Fig. 4; Fig. 9, shows a combined pointer and holder; Fig. 10, is a perspective view of the instrument without the gyroscope; Fig. 11, is a view of a worm gear and friction drive of watch H. Fig. 12, shows a simple pointer for a watch; Fig. 13, shows the taking of the meridian with combined gyroscope and watch; Fig. 14, shows a hand pointer on the crystal of a watch.

Referring to the figures: Fig. 10, is a perspective view of a rectangular equilateral frame, with its top, 1, and vertical sides 4, and 6. This frame may be made of any non-magnetic material; I have shown it of brass; it may be open or solid, provided it gives the necessary support; all the figures show it open: the feet, 8, 9, 10, (with a fourth not shown) rest upon a square flat metal sheet C, which is perforated at its center, D, for a pivot, which permits it to turn free horizontally on a board, or any suitable stand, as E, which becomes a turntable. The stand E, is provided with screws for leveling as at 14, 15, 16, (and one corner not shown); or the frame and its plate C, may be placed on a surveyor's tripod, or hung level by strings, or linked chains fastened in the four corners of the top, where holes are bored: these strings gathered in a single knot, can hold the instrument clear of the ground, enabling it to swing free, but are not necessary nor shown.

On the top of the frame 1, is a vernier compass A, with clamps and screws for holding it in place, and permitting its removal for correction shown at 41, 42, 43; this compass has folding or hinged standards, 18, 19; its levels, 20, 21, and magnetic needle N, S, under the standards, but shown more clearly in Fig. 3. In Fig. 10, on the standards 19, is a watch L, pivoted centrally over the pivot of the magnetic needle, so that the watch (its case, dial, and hands) can move horizontally over the scale of the compass, and this watch L, by means of the standard 19, can be lifted from the compass at any angle till vertical as shown at L Fig. 13. On the side 4, is shown a twenty-four hour dial watch, H, here supported in a holder K, which holder also acts as a pointer at its extremities, 70, and 71; (though the watch-case itself can be made in the same form, and become its own holder and pointer.) On the side 6, is shown a similar watch I, with a pointer 60 of another form, bored at its base Q to receive a small segmental scale 62 of 47 deg. and which can be divided into two sections of 23 and one half deg. each, which can be set to show the daily declination of the sun, as given in the nautical almanacs or shown by the analemmas of most globes: this is most clearly shown in Fig. 12.

In Fig. 10, the scales S, and P, over the watches I, and H, are central to the movement of these watches; thus the axle, 26, of the holder K of the watch H, is central to the pivots of its hands. This axle, 26, penetrates the side 4 to the opposite side of the frame, and on the end of said axle 26, and directly opposite the center of H, is a worm-wheel 49, of Fig. 11, which is moved by a screw, 63, which may be provided with a micrometer; the handle of the screw, 61, is shown projecting beyond the side 6, and its working mechanism shown in Fig. 11. By means of this screw 61, the watch H, with its pointer K, is given a rotary movement, the amount of which measured in degrees, or in divisions thereof, can be seen on the scale P. By this means together with the rotation of the frame the watch H, and its pointer K, can be directed to any visible object. The watch is shown secured to the pointer K, by clamps, 72, 73, 74, 75: these clamps are secured by thumb screws, in this case enabling the watch to be removed at will, though the watch and its winding apparatus, can easily be constructed for permanent use.

Immediately over the watch H, is a protractor scale, P, which may or may not be a whole circle; it is here shown as a half scale, the apex of which, 90 deg., is pointed to the zenith and when set true north and south, and true to the plumb-line will point to the meridian. (The plumb-line is here always regarded as at right angles to the levels, and pointing to the zenith, so that it may be used in place of the levels when so desired.) The plumb line dropped from the apex of the scale P, will bisect the end of the axle 26 and the pointer, and then the watch line when lined with this plumb-line will point to the meridian line; the levels of the compass serve to keep this line and scale true. (What we shall hereafter call the watch-line, is the line between the figures 24, and 12, of a twenty four hour dial watch, and the line on six and twelve of a twelve hour dial.) This watch H, can be moved to any angle; it can be most accurately effected by means of the pointer K, aided by the worm gear of Fig. 11. All the watch-lines, and all the watch hands can be moved in any horizontal direction as well as to any vertical angle, as the frame has a horizontal movement on the center D, while H, has its vertical motion on the axle 26, and thus like the equatorial telescope, the watch-line can be pointed at any portion of the heavens, as these two axes are at right angles to each other.

Fig., 1; shows an elevation of the side 6, and on it a watch, I, pivoted on said side with a nut and screw (not visible). The watch-line is set plumb to the level of the compass, 20, 21, and over it a scale S, the center of which is the pivot of the hour and minute hands, and this pivot is on a line directly under, and parallel to the plane of the compass scale, the watch I, turning on an axle similar to the axle 26, of Fig. 10, though not so long. To the ring of the stem of the watch I, is attached a small brass pointer, 60 shown in Fig. 12, for use in reading the scale S. The axle of the holder of the watch I, can either be attached directly to the watch case, or a similar holder to K, of watch H, can be used. The watch I can be turned for use on any side of the frame when turned on the pivot D, but when used on the north side, as its axis can be lined with the magnetic needle, or meridian, the hour hand will then travel with the apparent motion of the sun, and will help direct the stem of the watch L, (Fig. 10), to the true north and south line, as will be hereafter shown. (Figs. 1, 2, and 3, are diagrammatic.)

Fig. 2. is an elevation of the side 4, showing a twenty-four hour dial watch, H, in conjunction with a scale, P, both vertical and plumb to the levels, 20, 21, and the dial of the watch H, is centered on the axle, 26, (Fig. 10) by which the watch-line can be turned to any vertical angle; H, may be aided by the pointer K, here omitted, elsewhere shown.

Fig. 3: is a top view of the frame 1, with a watch L, its hands at Greenwich noon, and pointing directly south; this watch is pivoted centrally over the compass A, its scale and needle on one of the standards, 19, as shown in Fig. 10. As the center of the watch, L, is true to the compass scale, it has when moved on its axis, a horizontal movement, and either its hour hand or stem can be pointed at any degree of the compass scale; thus at six o'clock the hour hand of L, can point over the apex of P, of the watch H, while the stem of L, will point over the apex of the scale S, of watch I, because the construction of the frame is square with vertical sides. Continuing with Fig. 3, underneath the watch L, is the compass needle, N, S, with its scale, and the plane of this scale forms a horizontal right angle to the planes of both the scales S, P, and a line from the center of the needle to the apex of the scale S, marks a direction, and this direction is coincident with the plane of the meridian, when held due north and south, and it necessarily follows that the plane of the vertical side 4, carrying the watch H, is parallel to and practically coincides with the meridian, and the watch H, can mark any degree upon it. The standard of the compass 19, being hinged, the watch L, can be raised from the surface of the compass, so that the sunlight at any declination of the sun, can strike the watch dial at any angle as this watch has a universal movement as in Fig. 13.

Fig. 5, shows a common gyroscope on a side elevation. It stands upon a solid frame, 103, preferably of wood or brass as it may have a magnetic needle, and levels here indicated, and the horizontal scale, can be either at the foot on the frame, or fastened as an equatorial circle, this scale 0, 0, is simply accessory. The center of this gyroscope, is supposed to be on an east and west line with Figs. 1 and 4, and the axis 112 of the wheel 108, is shown dotted three hours down from the zenith at 45 deg. It shows its first ring 100, with its axes 105,106; the second ring 101, with axes 110,111; the flywheel 108, with its axes in ring 103, at 112,113. The ring 100, shows the scale at 0, 45, 90, and the zenith point 90, is shown to be the starting point of the axle of the flywheel.

Fig. 9. shows a pointer K, for more accurate work in aiding the watches to take angles. It may be cut from thin brass, and of any convenient length: From it project equally two ends at right angles to its face, 70, 71; these ends may, or may not be hinged to fold flat on its face; K is hinged at 64, to fold over the compass of the two ends of K, one is square, with a small projecting point 79, (Fig. 10). The point of 71, which is 78, is exactly on a line with 79 and this line is directly over the center of axle 26, and the watch-line. Along this line the end 71, is bored with one or more small pin holes. When lined with the sun, the point of 78, casts its shadow, exactly over the point 79, and the pin holes give a small round picture of the sun: To see this the better the end 70, may be covered with white paper, ruled to degrees, the better to observe the movement of the sun. When then the standards of the compass are lined true to the sun, as the sun's rays are parallel, the position of the shadow on 70, can be noted with great accuracy, as the sun picture marks about half a degree, the center of which is the exact sun-line. The axle 26, penetrates K, and is fastened firmly to it; the screws for holding the clamps of the watch are shown at 72, 73, 75. Immediately above the axle 26, K, is cut out, and left open to permit the scale P, to be seen. This cut may be entirely open, or may have a curved cross-bar 89, lining with the scale P, and on which the vernier may be marked. This cross bar at 87, is bored with a small hole, exactly on a line with the pointers 78, 79, and at 88, is a similar hole to receive a hair or spider's web, which will line with the watch-line and the scale P. This scale is preferably polished in order that the reflection of the web may true the scale and itself. For when the web is on a line with its reflection, the scale can be read with exactness and the watch line brought true to the line of the sun or the object observed.

Fig. 11. shows a worm gear wheel with its worm on axle 26, on the side opposite 4. It controls the movement of the watch line of watch H, by the action of the screw 61, on the toothed wheel 49, all which parts are fastened to the side of the frame in any suitable manner. This permits the watch H to be rotated by hand when so desired.

Fig. 12. shows the brass pointer 60, and the sliding declination scale 62; this scale may also be pivoted on the axis of the watch I; here it is simply for illustrative purposes drawn through the base of the pointer; the altitude can be taken by any pointer either K, or 60, and then moved back to the end of the scale 62, giving the true declination of the zenith to the equator, but all this is unnecessary, as when we know the sun's declination from the ephemeris, we simply add it to the altitude, and the result subtracted or added, (according to the sun's position,) to 90 deg. will give us the latitude.

Fig. 13. is a side elevation, similar to Fig. 2, showing the watch H, the pointer K, and the scale P, but in this case the watch L, over the compass is raised true to the plumbline, at right angles to its first position: On the compass is placed the gyroscope; the object of which is to hold the sidereal line; (the gyroscope having the well-known function of holding a straight line on the axis of its rotation, and when pointed at a fixed star, will hold this line, showing the rotation of the earth), the centers of the axes and the centers of the rings, being placed immediately over the center of the compass, and by construction over the pivot D, of the plate C. The axle of the fly-wheel is inclined to the south, 32 deg. altitude, on the N, S line, being supposed to be lined with the sun at its altitude at culmination. On the same line of inclination is shown the watch H, lined with the sun by the pointer K, and the view is from the west. The gyroscope can be hinged on a standard for removal, and the watch L provided with a scale, M, and a microscope M' on the standard, with a permanent pointer on it for reading the scale of the watch L.

The scale M, may be hinged; it is here shown solid.

All the watches may have complete scales on their dials and move to permanent pointers as L in Fig. 13, to pointer in front of microscope. Fig. 14. shows a pointer on the crystal of a watch to be used (when a stop watch is not used) over the second hand to take the second of observation as accurately as possible: It is constructed like the hand over a barometer.

Having thus described a mechanism capable of carrying out the purposes of my invention, I will proceed to describe the method of using such apparatus, and show the results obtained from such use. It is supposed that the user is familiar with the general principles of astronomy, and particularly the rule of geographers "that a clock set at a certain meridian will continue to tell the time of the meridian of the place where it was set, no matter where it is carried". This invention is dependent on a rule coincident with this, and discovered by the inventor, viz. "that with Greenwich solar time, the three watch hands of a twenty four hour watch (hour, minute, and second hands) and the line of the watch, and the sunline, can never all at once be plumb to the center of the earth except at the equator on the Greenwich meridian, on the equinox", and with Greenwich sidereal time, the watch hands and the line of the watch, and the star line can only be together plumb to the center of the earth, every midnight on the equator, on the Greenwich meridian. (The starline being an imaginary line in the celestial sphere, fixed by the astronomers as the starting point.) First, the user of this instrument, must learn to read latitude and longitude at the same instant from the watch. The watch H, being pivoted centrally to the scale P, with its pointer K, can be brought opposite any degree between the zenith and the horizon; this will not disturb the motion of the hands of the watch with reference to the dial, but places the dial and watch line in a definite position to the scale P, and thus can show latitude; thus H, in Fig. 10, points to an altitude of 32 deg. and were the sun on the equator, the latitude would be 90 less 32, or 58 deg. Or conversely reading from the north, every degree the north star would rise, when the instrument is carried north, would express latitude in taking the altitude of the celestial pole; this is shown in Fig. 13, by the dotted line 65, where the user is supposed to have traveled 39 deg. from the equator; the watch line pointed at the celestial pole would show, 39 deg. altitude and latitude. For reading longitude, Greenwich time, every meridian passed over by the sun has its set time and the hour hand of a twenty-four dial watch, consecutively passes over every possible meridian. Thus we can call the degrees from the time of a twelve hour watch, 15 degs. to the hour; but besides calling the degrees, by a twenty four hour watch the real angle is shown by the hour hand; further aided to exactness by the minute and second hands. The watch in this way becomes a double pointer, the watch line indicating latitude, while the hour hand points the distance from the Greenwich meridian. The user must bear in mind however always that the altitude of the celestial pole is identical with the observer's latitude, and that longitude is the Greenwich time when the sun passes the local meridian.

An observer is supposed to be on the equator, Greenwich meridian; the time is the equinox, and it is a dead calm, and the sun is shining; the observer is supposed to have before him the combined instrument represented by Figs. 1, 4, 5; the gyroscope and the watches facing us are lined on an east and west line, and the observer is facing south; the axle of the wheel of the gyroscope is pointed at the sun at mid-day and made to revolve; the watches are started at the same time, B, H, I, are pointed to the sun in the zenith, while the watch line of L, is pointed south. (The sun for this day being treated as a star, and no notice taken of its movement on the ecliptic.) As the watch I, faces the observer, and the motion of its hands is from east to west; the hour hands of I, and B, will follow the sun to its setting, when it will be on the horizon. This will be also true of the axle of the gyroscope, it will be horizontal with the hour hands of the watches; the watch L, having its hands pointed south at the beginning of this movement will also have its hour hand directly west, the stem of L, being held on the meridian as a perfect compass as long as the hour hand of I is pointed at the sun; if then the magnetic compass had been disturbed by the presence, of steel or any other local cause, the variation of the needle could have been noted. During this time the gyroscopic axle has pointed at the sun, and would have done so whether the sun shone or not; were the sun obscured the hour hand of I, could not be pointed at the sun, but if it were lined with the gyroscopic axis, L would continue to act as a compass, and observations of the sun taken by the gyroscope; this would be true in a closed room. But were the gyroscope, and the watch running true as is supposed, then the sun apparently would not set at six o'clock; the refraction of the atmosphere would hold the sun several minutes late in setting. In this case the amount of refraction could be marked by holding the hour hand true to the sun, which would move the watch line off the plumb line the amount due to refraction. Three months later were we in the same locality in midsummer about June 21, the watch I and the gyroscope would have their line of motion along the equator because the gyroscope holds true to the star, and the watch hands are directed along its line of motion, but at mid-day the sun would no longer be on the zenith but 23 and one-half degrees north, and this change of altitude could have been traced from day to day by the watch H, aided by its pointer K, acting as a small meridian circle.

There are many ways of determining latitude by this instrument. The meridian can be found as with any transit instrument. First at night by lining the compass line N. S. with the north star, or for greater exactness, as the north star is one and a quarter degrees from the celestial pole, this distance should be measured by the horizontal movement of the compass N. S. towards the star Mizar, (the middle star of the handle of the dipper), when both stars have the same altitude, or better when Mizar reaches its culmination, determined by the watch H, by measuring up the one and a quarter degrees from Polaris, and at the same time noting the variation of the compass. Staking this line we have the local meridian and the sun must culminate on this line. The local time of any star can then be taken, and compared with its Greenwich time. Of course the latitude as a consequence is taken at the same time, for when the pole star and Mizar are of the same altitude, that is the latitude, and it can be measured by either H, or I, refraction being allowed for.

For the meridian, latitude and longitude, in the day time when the sun is shining, the gyroscope need not be used; nor at night when the stars are shining; to find them I give two illustrations of taking meridian, longitude, and latitude, at the same time. On a sunny day I assume that I am at Cincinnati, Ohio, and desire to know my location. I see that my apparatus is in proper working order; by which I mean that the watchers are all set to exact Greenwich time, or any other accepted time; in this case we are accepting common solar time. I first place the frame level in such manner that the watch I, directly faces the sun; this disposition of the frame and watch referred to, brings the watch H with its watch-line along K, in position to be pointed at the sun. Now as the sun rises, the sun will be found to have a horizontal as well as a vertical movement as regards the instrument: The horizontal movement can be followed by lining the standards with the sun, and reading the compass scale to the needle: The pivot D, permits this motion of the instrument; the rate of this motion, which increases till the culmination, can be computed as the standards approach the needle, and experience as to the rate of this motion must be learned by continual observation; this gives the magnetic amplitude. While noting this horizontal movement, the vertical rise of the sun can be taken by the watch H, till it reaches 25 degrees altitude; I can now stop and wait until the sun culminates and declines to 25 degrees altitude, and the line on the compass between these two observations will be the meridian, and one half of the time occupied by the sun in its journey (between 25 deg. altitude A. M. and 25 deg. altitude P. M.) added to the time of the watch at the first observation, will give the longitude: of course properly corrected by the equation of time. But I continue to observe the sun after it has reached 25 deg. in the morning; and, I note that the rising movement rapidly diminishes as the sun approaches the culmination and this is in proportion as the horizontal motion increases, so that the time of culmination can be foretold and noted with great exactness; and noting the time when the sun stops rising I find it to be 5 hours and 38 minutes from the Greenwich meridian; which means that Cincinnati is 84 deg. and 30 minutes west. I find the altitude of the sun to be 32 deg. for the watch line points this out on the scale P. As this observation is supposed to be taken on the 12 day of November, the almanac gives the sun's declension as about 19 deg., this must be added to the altitude to give the celestial equator, and so makes our latitude 39 deg. To prove it we have simply to turn to the north star at night as before shown. The watch then has been so placed that it shows latitude and longitude at the same instant, while other instruments give them separately. With the meridian found the watch L can be set to local time, and still act as a compass. At this time the correction of the magnetic compass can be made, for the culmination took place one degree before the sun crossed the magnetic meridian, for the standards showed the sun line one degree east of the needle when the pointer K, showed the sun at its highest. Had the culmination taken place after crossing the magnetic meridian the correction would have been west. At this time if the hour hand of L is moved to a line with the sun, the watch-line will read on the compass scale 84 deg. and 38' east, which shows that the Greenwich meridian is that number of degrees east of Cincinnati (as indicated by 140, Fig. 3), and also the true angle. When using a twelve hour dial to show this, or when using the twelve hour watch as a compass, all the angles of the hour hand with the watch line must be divided by two to show the true angles, and to hold the watch line true to the meridian line when the hour hand is pointed at the sun. When the hour hand of the watch L on the compass takes the meridian line, this can be used as a new watch line as twenty four o'clock, or twelve o'clock (of the common watch), for the watch line is as arbitrary as the Greenwich meridian as the starting point. As also the gyroscope may be started on any meridian, but the watch should be set to the gyroscopic meridian time, for use with this instrument.

For observation on a cloudy day, if the gyroscope were set to the sun, it is plain it would have culminated precisely as the sun and at it's culmination have come to a true north and south line, as shown in Fig. 13, where the gyroscope is shown pointing an altitude of 32° on that line. This can also be shown by Fig. 4 using the watch line of B to take the altitude at the culmination, which would show 5 hours and 38 min. late of Greenwich time. From this it appears that the watch can be treated as a species of gyroscope, when the axis of the stem of the watch (in this case used as the watch line) is directed towards a celestial object which may be the sun on the equator on the 21 day of March: As sunlight or star light holds a true line to the center of the earth, (disregarding the paralax), when the watch is pointed to this line at true meridian noon and set going, the angles made in traveling off this meridian are shown in either direction. The electric gyroscope holds a straight line by its momentum, and shows the revolution of the earth in 24 hours; the small hand of a 24 hour watch and its watch line will coincide with such a gyroscope as long as they remain at rest on the equator; but when carried off the meridian the time of culmination of the gyroscope will be changed at the rate of one hour for every 15 deg. and the difference will be read on the watch. This would be true for any place on the surface of the earth, and thus location could be told in a closed room, as we know north and south from the compass, angles and the center of the earth from the levels, Greenwich meridian time from the watch, and a star line from the gyroscope, and its culmination from the rotation of the earth.

When using the gyroscope with the sun, a constant allowance has to be made for the movement of the earth in its orbit, this amount being given in the ephemeris. With reference to night observations it is evident that the gyroscope will assume a north and south line on the nadir as the reverse of the culmination when on the equator, though at this point north and south have to be known by the direction of movement and the compass. All observations must be made with correct meridian time, found by adding or subtracting the equation of time as given in the ephemeris. The true position of the hour hand must be determined by the minute and second hands as a limited number of cogs may give it a slightly irregular movement. The local time is most easily used by the learner with a compass on watch L. When great accuracy is required a small telescope can be used in place of K, the watch line being used along the line of collimation.

Fig. 13 shows a form in which the compass, gyroscope, and watch L, can be removed from the rest of the instrument, and used on a Jacob's staff as a complete instrument.

The whole apparatus is regarded as in its generic form, and subject to any amount of specific variation.

To aid in the thorough understanding of this invention, Fig. 4 shows a modified construction of Fig. 10, in which one watch, B, is made to assume all the positions of the watches H, I, L. It is intended to illustrate how the watch lines or the hour hands of these watches can be made to take every position of the gyroscopic axis. The frame 51, and 52, is a suitable stand of brass or other non-magnetic material, the base of which is turned true and of circular form in order that its edges may be marked with a scale, similar to that of the compass A: It may have levels and compass as indicated. The watch, B, faces the observer who is supposed to be facing south, the stem and hands are pointing to the zenith, and the movements of the watch hands are directly east and west supposedly on the prime vertical. To the frame 51 is bolted the solid ring 50, at the points 53, and 54; this is similar to the first ring of the gyroscope as in Fig. 5 at 100, and is joined to the second ring 56, by the pivots 55 and 57. At right angles to 55 and 57, in the ring 56 are two more pivots 58, 59 which join a ring 92, and in this 92, in place of the fly wheel of a gyroscope, is placed a watch, B, the bottom holder of which, 120, 121, is pivoted at 91 and the stem of the watch by means of its catch 123, 124, acts as a pivot opposite to 91, and enables the watch to face in any direction, as the rings are on axes at right angles, and permit the watch line or hour hand to be pointed in any direction, as described in connection with Fig. 10. The ring 50 is marked with a scale here shown only at 0, 45, 90, and this corresponds with the scales S, P, of I, and H. The axle 55 corresponds with the axle D, of Fig. 10, so that in connection with the scale of the bottom of frame 51, measurements can be taken in any horizontal direction. Thus it is shown that the watch line of B can be made to assume any position of the axis of the fly-wheel of the gyroscope.

Fig. 6 is a perspective view of the watch-holder 120, 121, of the watch B holding it in place in its ring by the arms which turn on the pivot 91.

Fig. 7, shows the stem 130 of the watch B half penetrating the ring 92, and it is held in the ring by the catch 123, 124, which works as a hinge at 123 and catches in 92, at 124, holding the round stem 130 in place but allowing 130 to act as an axis with the holder 120, 121, this axis being on a line with 12, 24 of B.

Fig. 8, shows the catch of Fig. 7 by itself with its hinge at 123, and catch at 124.

Having thus fully described my invention, I claim;—

1. In combination, a segmental scale arranged with its plane vertical, a level arranged to properly set said scale, and a watch movably mounted adjacent to said scale in such a position that the hands of the watch may be used to read latitude and longitude, substantially as described.

2. In combination a segmental scale arranged with its plane vertical, a level arranged to properly set said scale, and a watch movably mounted adjacent to said scale in such position that a line drawn from the center of the watch through its highest number and extended beyond may be read upon said scale in divisions or fractions thereof, substantially as described.

3. In combination, a compass, means for leveling the same, a watch movably mounted concentric with said compass and adjacent thereto in such a position that the hands of said watch may be used as pointers for the divisions of said compass, substantially as described.

4. In combination a compass, means for leveling the same, a watch movably mounted concentric with said compass and adjacent thereto in such a position that a line drawn from the center of the watch through its highest number and extended beyond may be read upon the divisions of said compass, substantially as described.

5. In combination a compass, means for leveling the same, a segmental scale arranged with its plane vertical and controlled by said leveling means, a watch movably mounted adjacent to said scale in such a position that its hands may be used as pointers for said scale, substantially as described.

6. In combination a compass, means for leveling the same, a segmental scale arranged with its plane vertical and adjusted by said leveling means, a watch movably mounted concentric with and adjacent to said compass in such a position that a line drawn from the center of said watch through its highest number and extended beyond, may be read upon the divisions of said compass, and a watch movably mounted adjacent to said vertical scale in such position that a line drawn from the center of said watch through its highest number and extended beyond may be read upon the divisions of said scale, substantially as described.

7. In combination, a compass maintained in a constantly horizontal position to the horizon, a watch whose axis is constantly maintained at right angles to the plane of the compass and may be maintained with its watch line at any angle, a segmental scale with a pointer carried by the watch in line with the watch line of said watch, said watch supported to be rotated both around the axis of its pivot and in circle around the axis of the compass, and a second watch the axis of which is at right angles to the axis of the compass, supported to be rotated, and at right angles to said first named watch so as to face and be moved in the direction of a celestial object, and to carry the other mechanism with it, and a scale with which said pointers coact, said second named watch, serving as an auxiliary to the other mechanism, substantially as described.

ROBERT LIVINGSTON STEVENS.

Witnesses:
GEORGE S. BAILY,
WM. J. PECK.